United States Patent [19]
Leach

[11] Patent Number: 6,128,725
[45] Date of Patent: Oct. 3, 2000

[54] MICROPROCESSOR WITH AN INSTRUCTION FOR SETTING OR CLEARING A BIT FIELD

[75] Inventor: Jerald G. Leach, Richmond, Tex.

[73] Assignee: Texas Instruments Incorporated, Dallas, Tex.

[21] Appl. No.: 09/012,327

[22] Filed: Jan. 23, 1998

Related U.S. Application Data

[60] Provisional application No. 60/035,843, Jan. 24, 1997.
[51] Int. Cl.[7] .................................................. G06F 9/30
[52] U.S. Cl. ............................................................ 712/200
[58] Field of Search .................................... 712/200, 223, 712/224

[56] References Cited

U.S. PATENT DOCUMENTS

| | | | |
|---|---|---|---|
| 4,941,085 | 7/1990 | Sakamura et al. ....................... | 395/564 |
| 5,210,835 | 5/1993 | Sakamura et al. ....................... | 395/375 |
| 5,835,793 | 11/1998 | Li et al. .................................... | 395/898 |

*Primary Examiner*—David Y. Eng
*Attorney, Agent, or Firm*—Gerald E. Laws; W. James Brady, III; Frederick J. Telecky, Jr.

[57] ABSTRACT

A microprocessor 1 has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written, and a memory 22. Execution unit S1 has circuitry for clearing or setting a designated bit field in a source operand in one execution phase of an instruction execution pipeline.

12 Claims, 11 Drawing Sheets

| Pipeline Phase | Symbol | During this Entire Phase | By the End of This Phase |
|---|---|---|---|
| Program Address Generate | PG | | ▫ Except when a program store is in E1, PFC and PADDR and latched to their next values: either the next 8-word boundary after the current PFC or a branch target address.<br>▫ When a program store is in E1, the PFC remains unchanged and PADDR takes the value from the program store instruction. |
| Program Address Send | PS | ▫ PFC valid on PADDR.<br>▫ If a fetch packet fetch needed, PRS set active. | ▫ If PRS active, PMS latches PADDR. |
| Program Wait | PW | ▫ If the fetch packet indicated by the last PRS is necessary, PDS is asserted. | ▫ If PDS is asserted, PMS latches the last requested fetch packet to be driven during PR. |
| Program Data Receive | PR | ▫ If PDS active during the associated PW, PMS drives requested fetch packet onto PDATA_1. Otherwise the previous fetch packet driven on to PDATA_1 is maintained. | ▫ If it can be determined that the fetch packet requested by an active PDS in PW is needed, CPU latches this fetch packet on PDATA_1. Otherwise, this latch maintains state. |
| Dispatch | DP | | ▫ Parallelism of the fetch packet detected.<br>▫ Instructions in the next requested execute packet in the fetch packet dispatched to the appropriate functional units.<br>▫ Detection of the software breakpoint code in the CREG field detected.<br>▫ Multi-cycle NOP, NOP, SWI, and IDLE decoded because they are not passed to individual functional units.<br>▫ PC of the execute packet in DP latched at the end of the cycle as PCDC. |
| Decode | DC | ▫ PCDC valid. | ▫ Control signals for actions during execute decoded. |

FIG. 3B

| Pipeline Phase | Symbol | During this Phase | By the End of This Phase | CPU has Completed Types |
|---|---|---|---|---|
| Execute 1 | E1 | ☐ All Types: Registers read. | ☐ Type ISS: Results written to the register file.<br>☐ Type ISS: Status written to the control register file.<br>☐ Type LD and ST: Address modifications written to the register file.<br>☐ Type LD and ST: DADDR, DBS, and DRNW latched for next phase.<br>☐ Type ST: DDATA_0 latched for next phase.<br>☐ Type BRANCH: PFC and PADDR latches the target address.<br>☐ Type STP: PADDR latches the destination address if no fetch is pending. PWS latched as active for next phase.<br>☐ Types LD, ST, STP, IMPY: Intermediate states latched. | ☐ ISC.<br>☐ BR. |
| Execute 2 | E2 | ☐ Types LD and ST: DBS active and DADDR valid.<br>☐ Type LD: DRNW active.<br>☐ Type ST: DRNW inactive and DDATA_0 valid. | ☐ Type IMPY: Results written to the register file.3<br>☐ Type IMPY: Status written to the control register file.<br>☐ Types LD and ST: DMS latches ADDR.<br>☐ Type ST: DMS latches DDATA_0.<br>☐ Type STP: PMS latches PDATA_0.<br>☐ Type LD: Intermediate states latched. | ☐ IMPY.<br>☐ STD.<br>☐ STP. |
| Execute 3 | E3 |  | ☐ Type LD: DMS latches data requested during the last cycle.<br>☐ Types LD: Intermediate states latched. |  |
| Execute 4 | E4 | ☐ Type LD: DMS drives on DDATA_1 data requested during associated E2. | ☐ Type LD: DDATA_1 latched.<br>☐ Types LD: Intermediate states latched. |  |
| Execute 5 | E5 |  | ☐ Type LD: DDATA_1 right-aligned, either sign-extended or zero-filled, and written to the register file. | ☐ LD. |

MICROPROCESSOR WITH AN INSTRUCTION FOR SETTING OR CLEARING A BIT FIELD

CROSS REFERENCE TO RELATED APPLICATIONS

This application claims priority from the Provisional application Ser. No. 60/035,843 filed Jan. 24, 1997.

This application is related to coassigned application Ser. No. 09/012,813 filed contemporaneously herewith and incorporated herein by reference.

TECHNICAL FIELD OF THE INVENTION

This invention relates to data processing devices, electronic processing and control systems and methods of their manufacture and operation.

BACKGROUND OF THE INVENTION

Microprocessor designers have increasingly endeavored to improve performance in various microprocessors by defining an instruction which does a common function in order to save executing a number of instructions to perform the same function. For this reason, some microprocessors have an instruction for setting a selected bit field in an operand to all 1's, or for clearing a selected bit field in the operand to all 0's. Typically, a sequence of microcode instructions is used to implement such a bit field instruction by shifting 0's or 1's, as appropriate, into the operand at a designated location. As a result, several iterative cycles are required to execute a bit field instruction.

An object of the present invention is to overcome the performance delay caused by iterative execution of microcode for a bit field instruction.

SUMMARY OF THE INVENTION

In general, and in a form of the present invention, a data processing device is provided for executing an instruction which sets a field in a source operand to a all ones or to all zeros. The device has source circuitry which provides a source operand, destination circuitry to receive a destination operand, and circuitry to hold two constants which specify the boundary of a bit field in the source operand which is to be modified. Setting circuitry forms the destination operand by setting all bits within the specified bit field to all ones or all zeros in a single instruction execution phase.

In another form of the present invention, a method for executing an instruction within a data processing device which sets a field in a source operand to a predetermined value comprises the steps of: providing said source operand; holding a first constant which indicates a first bit position in the source operand; holding a second constant which indicates a second bit position in the source operand; and forming a destination operand by setting all bits between the first bit position and the second bit position to all ones or all zeros in a single instruction execution phase.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which.

Corresponding numerals and symbols in the different figures and tables refer to corresponding parts unless otherwise indicated.

DETAILED DESCRIPTION OF EMBODIMENTS OF THE INVENTION

Figure 1:
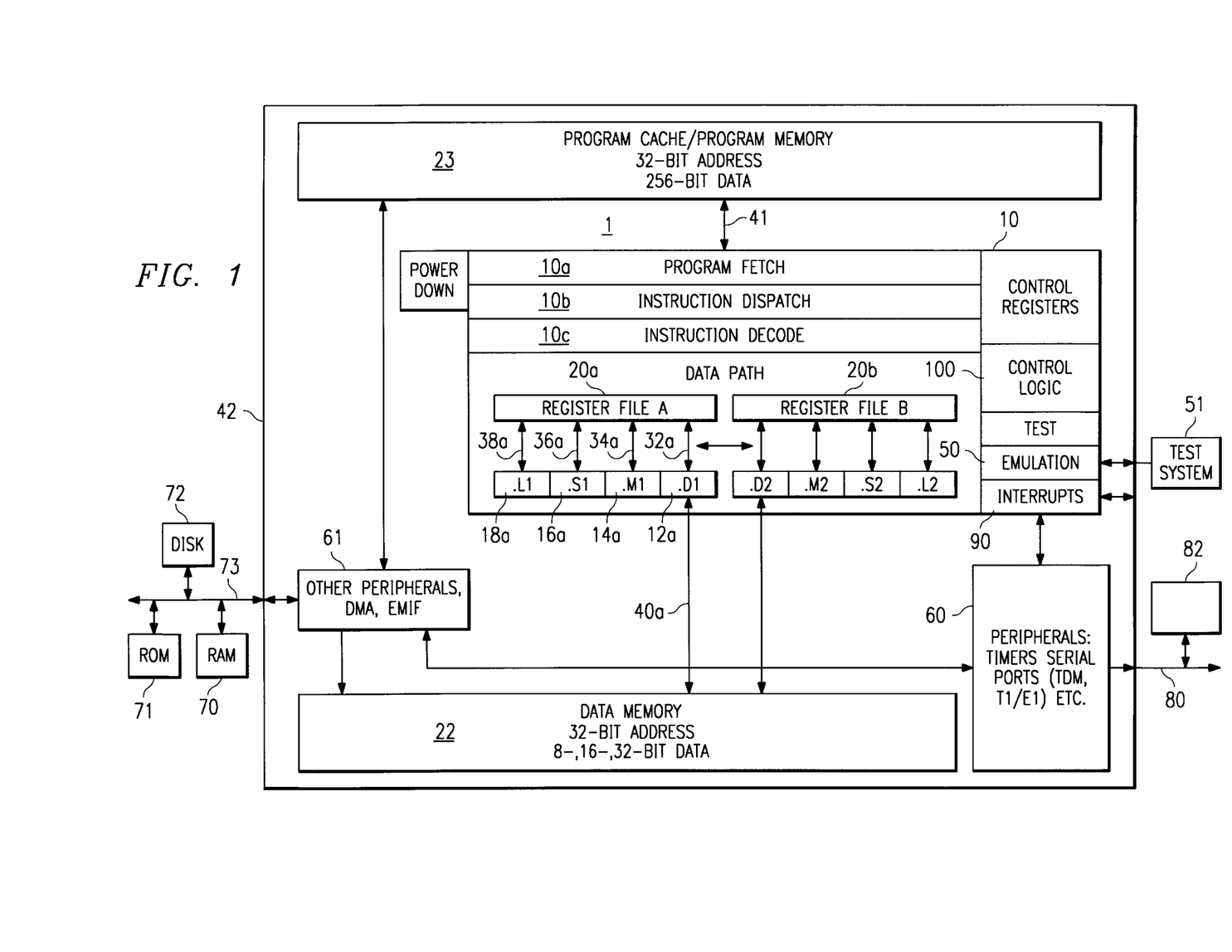
FIG. 1 is a block diagram of a microprocessor which has an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1 is provided in coassigned application Ser. No. 09/012,813 (TI-25311). A description of a complete set of instructions for the microprocessor of FIG. 1 is also provided in coassigned application Ser. No. 09/012,813 (TI-25311).

Figure 2:
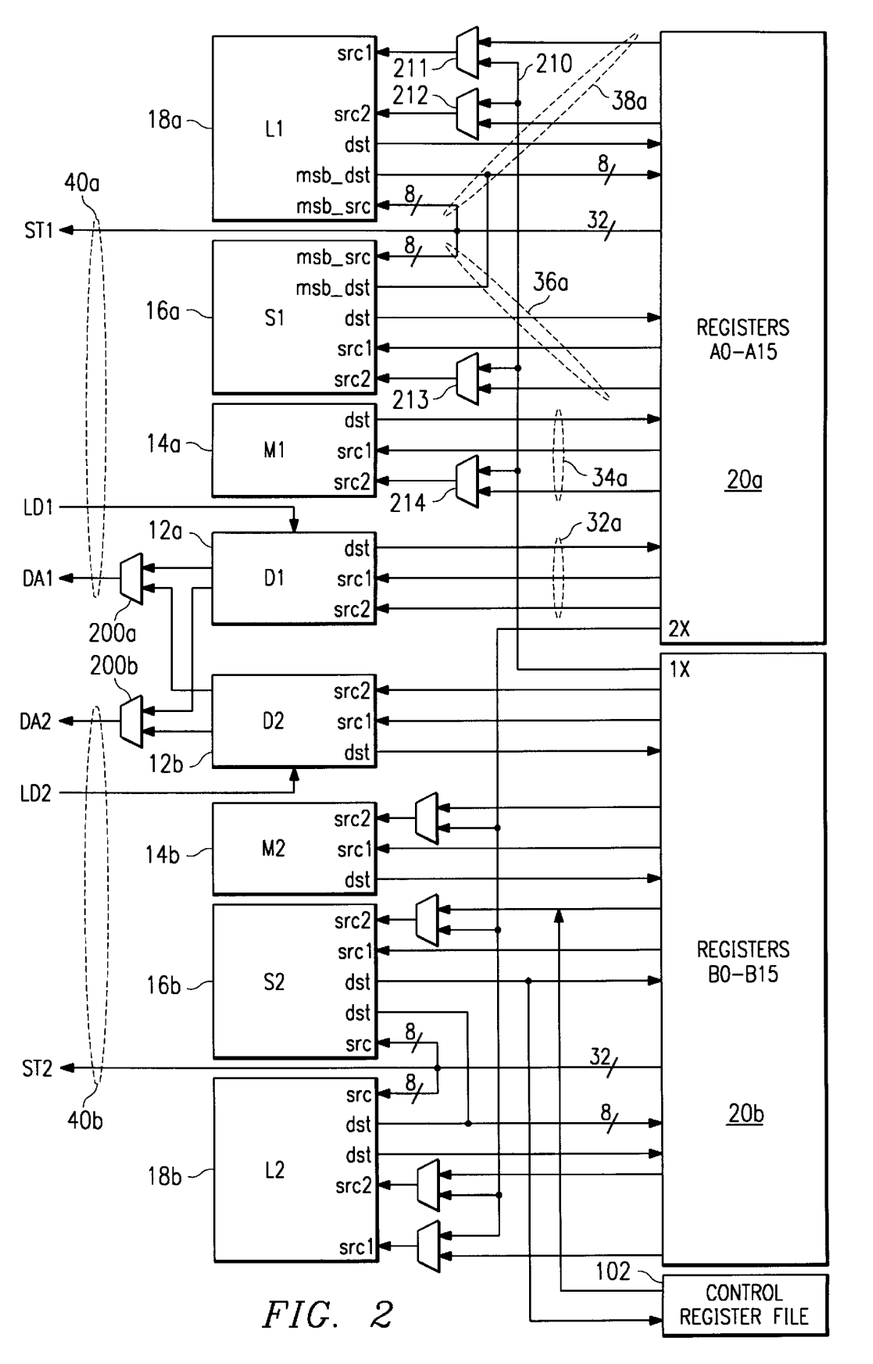
FIG. 2 is a block diagram of the execution units and register files of the microprocessor of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

Figure 3A:
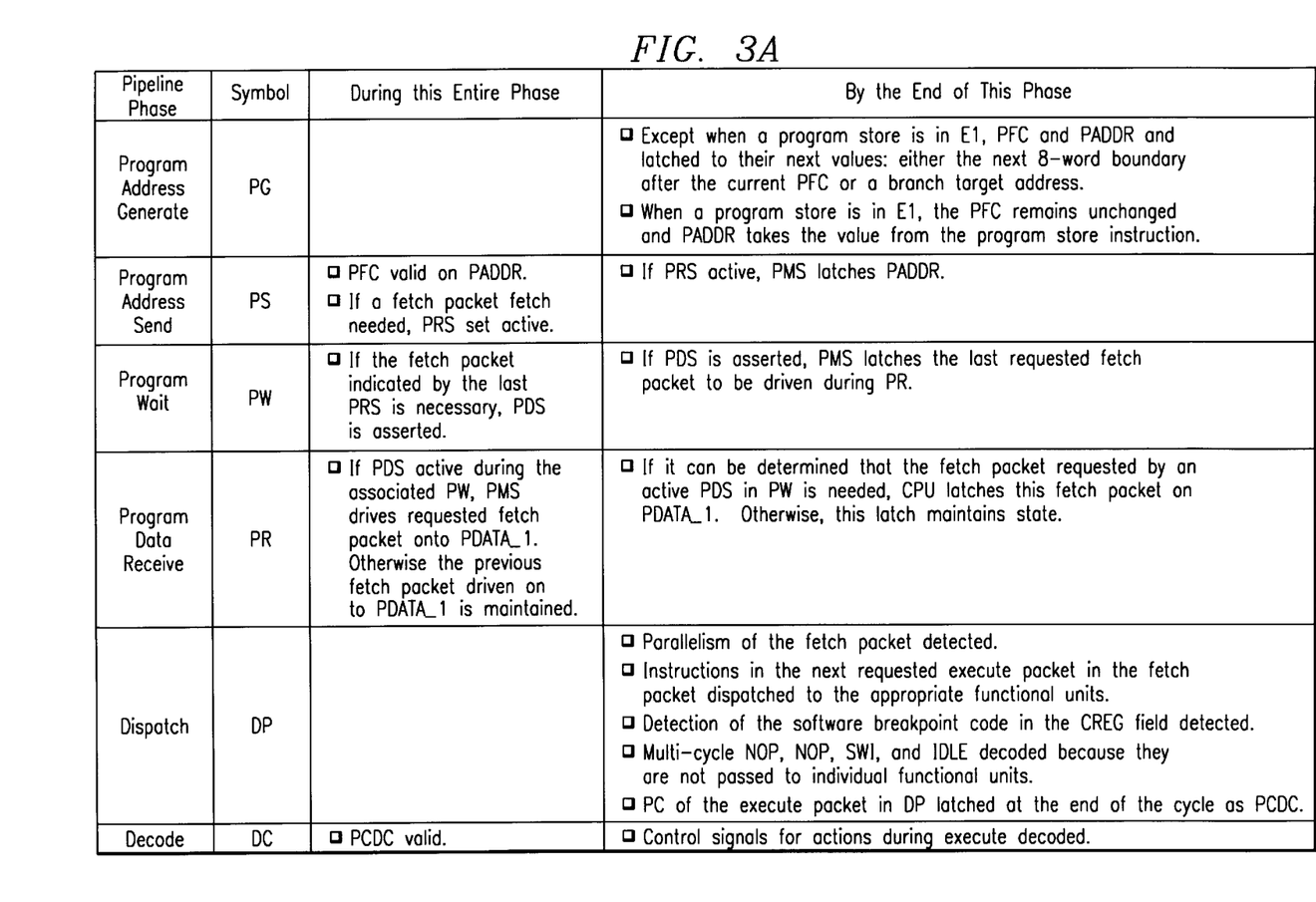
FIG. 3A is a chart which illustrates the processing phases of an instruction execution pipeline in the microprocessor of FIG. 1.

FIG. 3A is a chart which illustrates the processing phases of an instruction execution pipeline in the microprocessor of FIG. 1. Each phase corresponds roughly to a clock cycle of a system clock. For example, if microprocessor 1 is being operated at 200 MHz, then each phase is nominally 5 Ns. However, in a phase where data is expected from a memory or peripheral, such as RAM 70, the pipeline will stall if the data is not ready when expected. When stalled, a given pipeline phase will exist for a number of system clock cycles.

In FIG. 3A, the first phase of processing an instruction is to generate the program address in phase PG. This is done by loading a program fetch counter PFC which is located in control register file 102. During the second instruction processing phase PS, an address of an instruction fetch packet is sent to program memory 23 via a program address bus PADDR which is part of bus 41. The third phase PW is a wait phase to allow for access time in memory 23. During the fourth phase PR, a program fetch packet is available from program memory 23 via data bus PDATA_I which is part of bus 41. During the fifth processing phase DP, instruction parallelism is detected and instructions that can be executed are dispatched to the appropriate functional units. This aspect of pipeline operation will be described in more detail in later paragraphs. During the sixth processing phase DC, executable instructions are decoded and control signals are generated to control the various data paths and functional units.

Figure 3B:
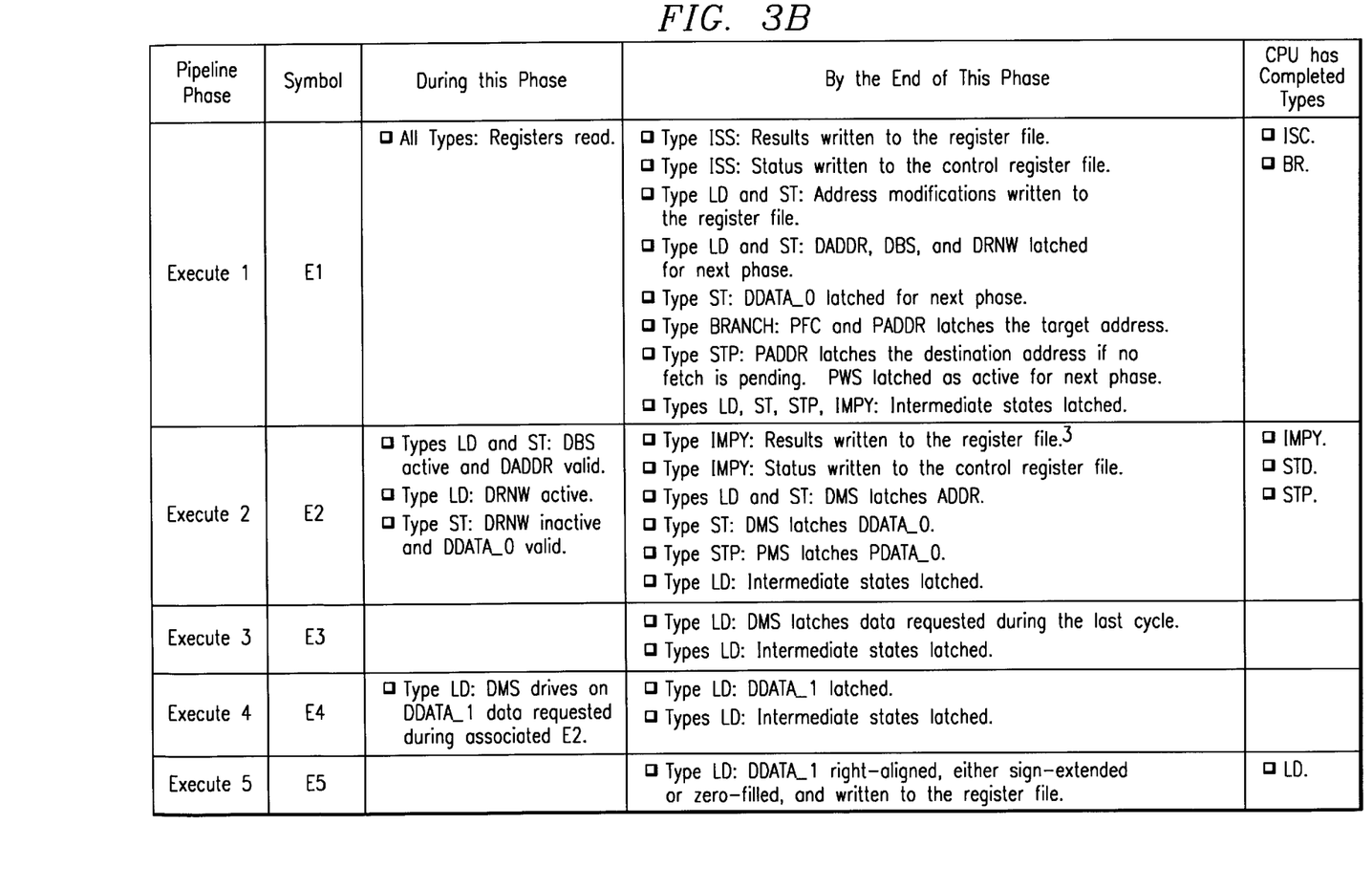
FIG. 3B is a chart which illustrates the execution phases of the instruction execution pipeline in the microprocessor of FIG. 1.

FIG. 3B is a chart which illustrates the execution phases of the instruction execution pipeline in the microprocessor of FIG. 1. During the first execution phase E1, single cycle instructions, referred to as "ISC", and branch instructions, referred to as "BR", are completed. A designated execution unit performs the operations indicated in FIG. 3B as directed by control circuitry 100. During the second execution phase E2, the following types of instructions are completed by designated execution units under control of control circuitry 100: integer multiply (IMPY), program store instructions (STP), and data store instructions (STD). During the third execution phase E3, execution of load data instructions (LD) continues by latching data from the data memory system (DMS), as indicated. During execution phase E4, the data latched in E3 is transferred to a data input register DDATA_I in execution unit D1 or D2. During execution phase E5, the LD instruction is completed by manipulating the data in register DDATA_I and writing the manipulated data to a specified register in register file 20a or 20b.

Figure 4:
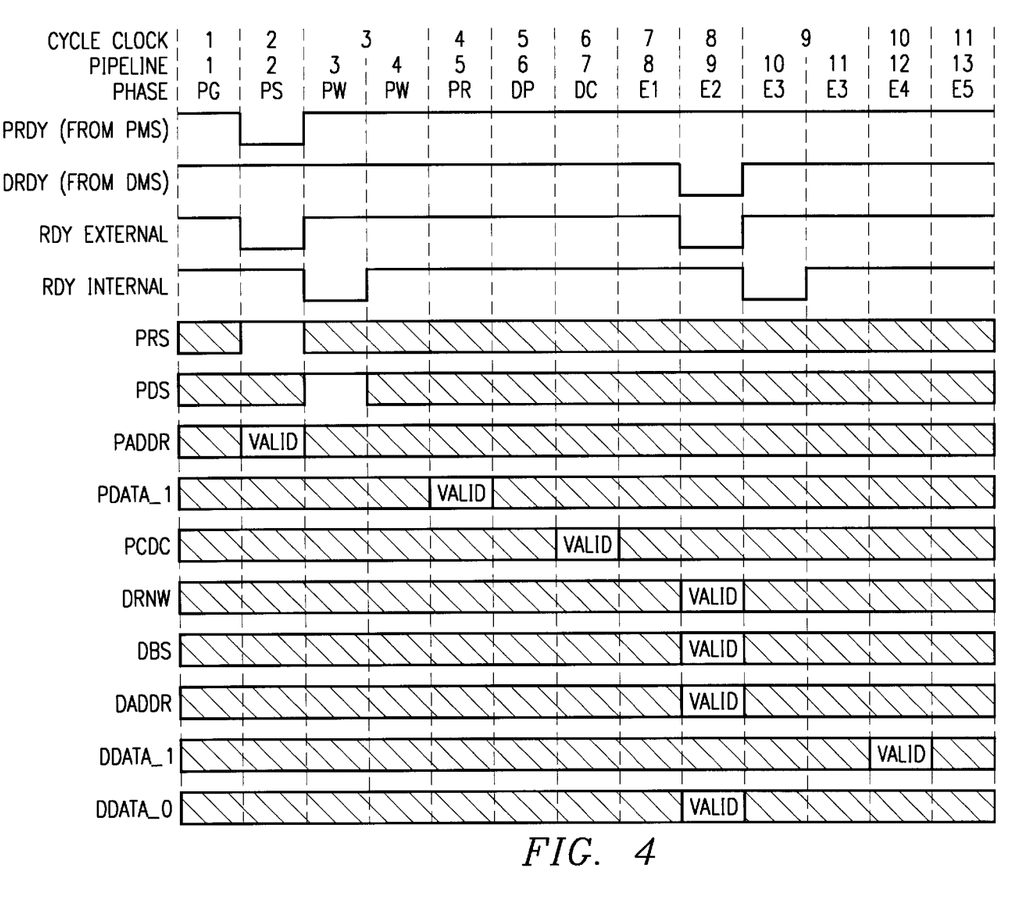
FIG. 4 is a timing diagram which illustrates timing details of processing an instruction fetch packet during the processing phases of FIG. 3A and execution of the execution packet during the execution phases of FIG. 3B.

FIG. 4 is a timing diagram which illustrates timing details of processing an instruction fetch packet during the processing phases of FIG. 3A and execution of the execution packet during the execution phases of FIG. 3B. Note that a pipe stall is illustrated in phase PW due to a program memory ready signal PRDY being low in phase PS, and a second pipe stall in phase E3 due a data memory ready signal DRDY being low in phase E2.

Figure 5A:
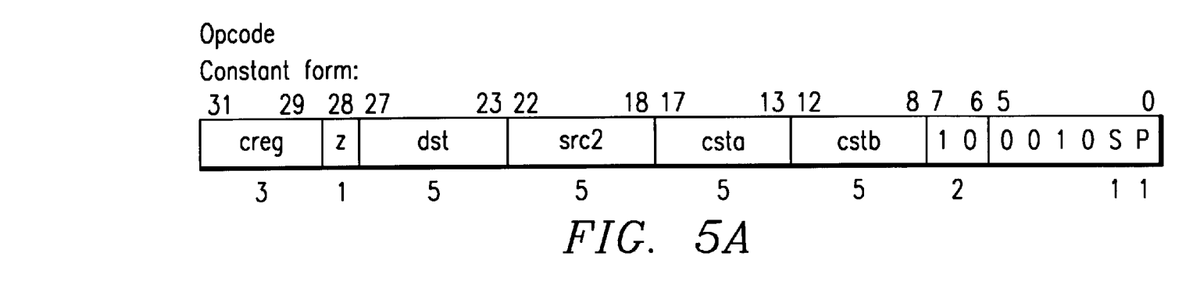
FIGS. 5A and 5B illustrate opcode forms for a Set a Bit Field instruction for the microprocessor of FIG. 1.
Figure 5B:
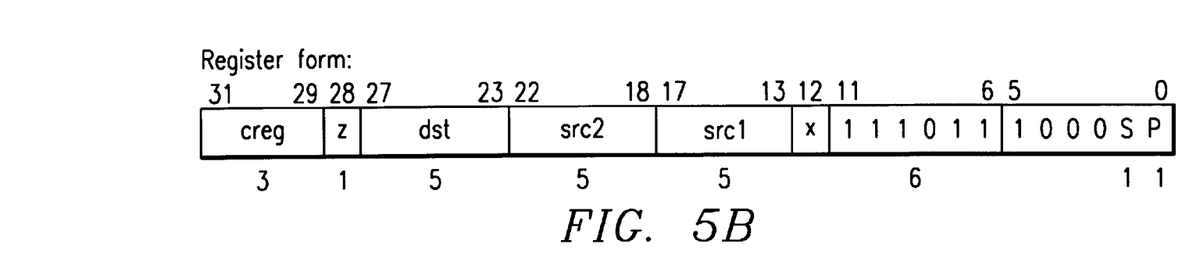

FIGS. 5A and 5B illustrate opcode forms for a Set a Bit Field instruction for the microprocessor of FIG. 1. FIG. 5A shows a form of the instruction in which the boundaries of the selected bit field are specified by two constant fields in the instruction itself. A destination field dst specifies a destination register in register file 20a which receives the result operand of the instruction. A source field src2 specifies a register in register file 20a which holds a source operand into which a specified bit field will be set. A constant field csta specifies the bit number of the least significant bit in the field to be set. A second constant field cstb specifies the bit number of the most significant bit in the field to be set.

FIG. 5B shows a form of the instruction in which the boundaries of the selected bit field are specified by two fields in a register in register file 20a which is designated by the instruction. Otherwise, the operation of both forms to the instruction is the same.

Figure 6:
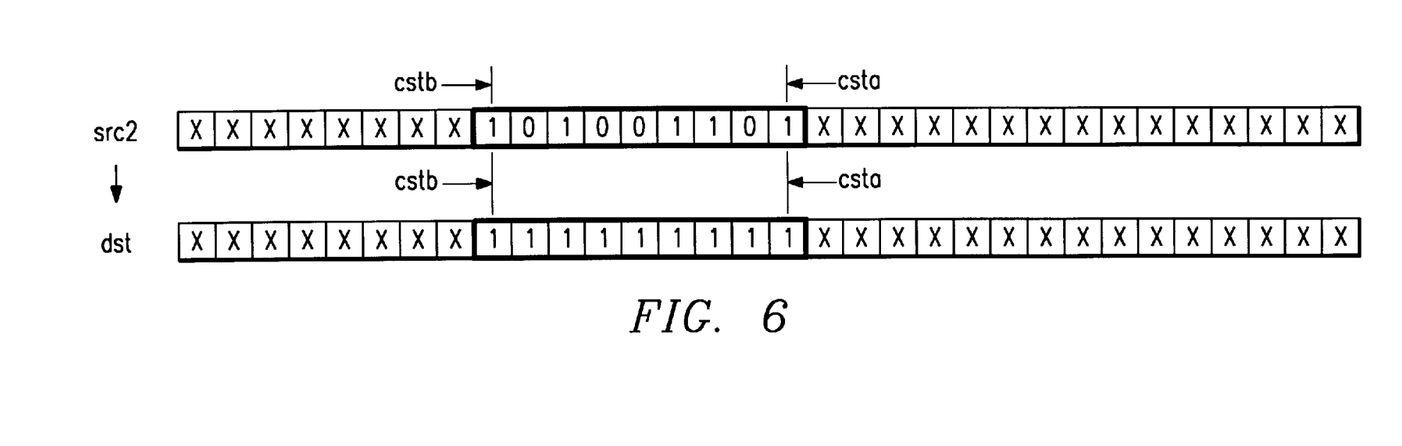
FIG. 6 illustrates the operation of the Set a Bit Field instruction of FIGS. 5A–5B.

FIG. 6 illustrates the operation of the Set a Bit Field instruction of FIGS. 5A–5B. When a Set a Bit Field instruction is executed, a source operand stored in a register specified by the source field src2 is selected by execution unit S1. All of the bits in a bit field defined by constant fields csta and cstb are set to 1 within execution unit S1. A copy of the modified source operand is then written to a register specified by the destination field dst. Likewise, the instruction may be executed on execution unit S2 using register file 20b by setting bit "s" in the instruction to a 1. According to an aspect of the present invention, this entire execution operation is advantageously performed in a single execution phase of the instruction execution pipeline of CPU 10.

Figure 7A:
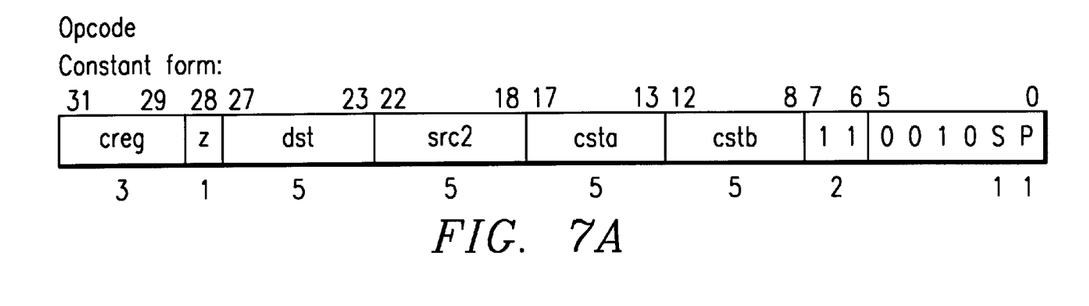
FIGS. 7A and 7B illustrate opcode forms for a Clear a Bit Field instruction for the microprocessor of FIG. 1.
Figure 7B:
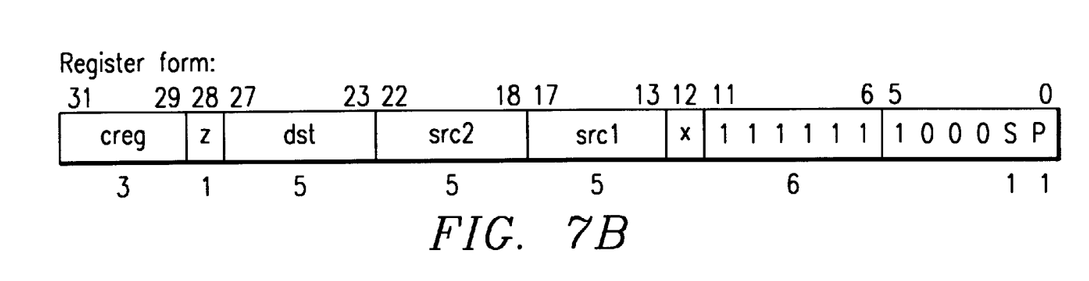

FIGS. 7A and 7B illustrate opcode forms for a Clear a Bit Field instruction for the microprocessor of FIG. 1. FIG. 7A shows a form of the instruction in which the boundaries of the selected bit field are specified by two constant fields in the instruction itself. A destination field dst specifies a destination register in register file 20a which receives the result operand of the instruction. A source field src2 specifies a register in register file 20a which holds a source operand into which a specified bit field will be cleared. A constant field csta specifies the bit number of the least significant bit in the field to be set. A second constant field cstb specifies the bit number of the most significant bit in the field to be cleared.

FIG. 7B shows a form of the instruction in which the boundaries of the selected bit field are specified by two fields in a register in register file 20 which is designated by the instruction. Otherwise, the operation of both forms to the instruction is the same.

Figure 8:
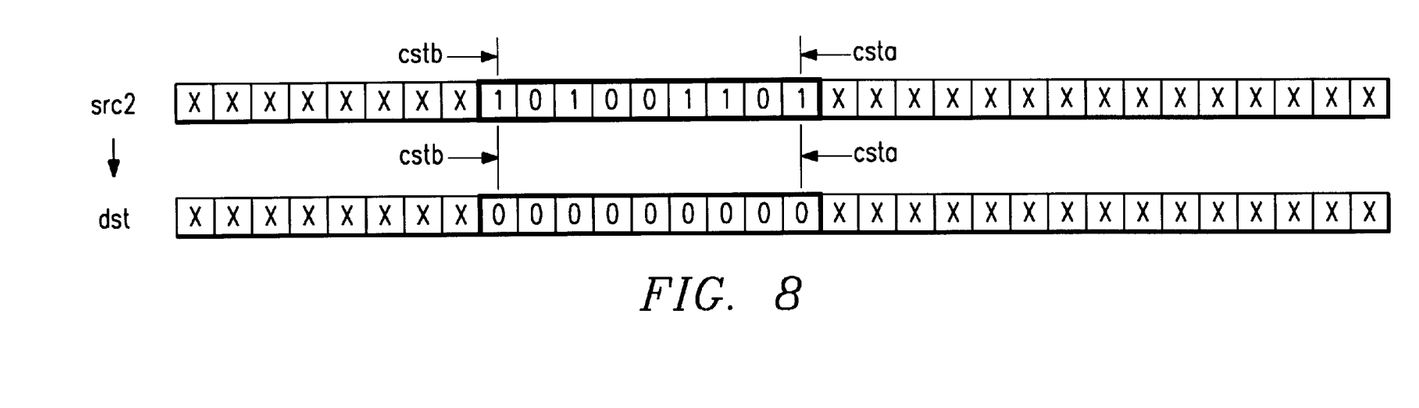
FIG. 8 illustrates the operation of the Clear a Bit Field instruction of FIGS. 7A–7B.

FIG. 8 illustrates the operation of the Clear a Bit Field instruction of FIGS. 7A–7B. When a Clear a Bit Field instruction is executed, a source operand stored in a register specified by the source field src2 is selected by execution unit S1. All of the bits in a bit field defined by constant fields csta and cstb are set to 0 within execution unit S1. A copy of the modified source operand is then written to a register specified by the destination field dst. Likewise, the instruction is executed on execution unit S2 using register file 20b if bit "s" in the instruction is a 1. According to an aspect of the present invention, this entire execution operation is advantageously performed in a single execution phase of the instruction execution pipeline of CPU 10.

Figure 9:
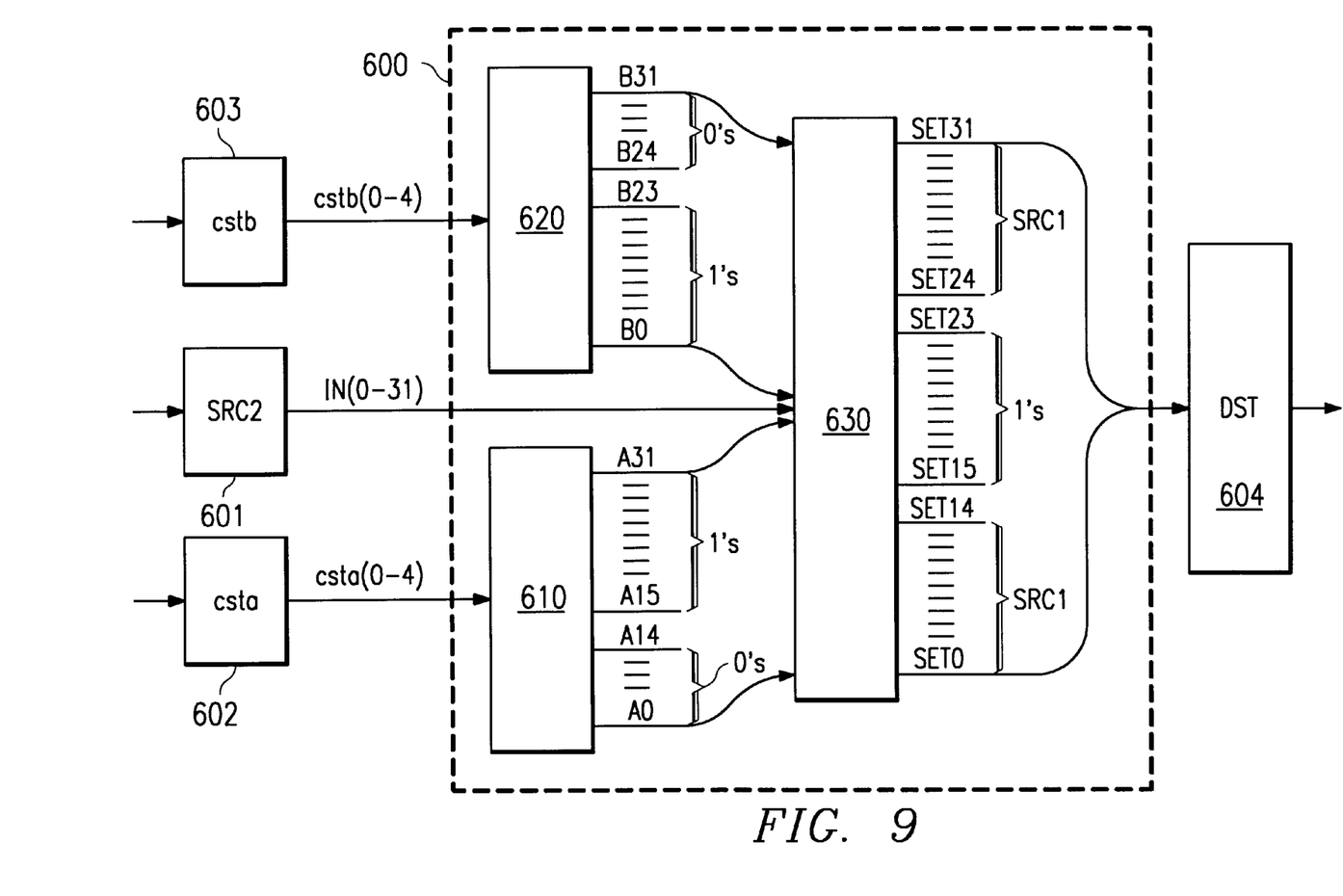
FIG. 9 is a block diagram of logic to implement the Set and Clear Bit Field instructions of FIGS. 5A–5B.

FIG. 9 is a block diagram of setting circuitry 600 to implement the Set and Clear Bit Field instructions of FIGS. 5A–5B in a single instruction execution pipeline phase. Both types of instructions operate similarly and can advantageously use the same circuitry to execute the instructions in one pipeline phase. Setting circuitry 600 of FIG. 9 is incorporated into execution units S1 and S2 in CPU 10.

In FIG. 9, source operand circuitry 601 is the register selected by source field src2 in the Set or Clear instruction. Likewise, destination operand circuitry 604 is the register selected by destination field dst in the Set or Clear instruction. Constant-A holding circuitry 602 and constant-B holding circuitry 603 hold the data from field csta and cstb, respectively, from an instruction during execution or from a source register specified by the instruction, as discussed with regard to FIGS. 5A–5B. Least significant bit (lsb) mask generation circuitry 610 forms a 32 bit mask based on a number specified by constant field csta from the instruction or from the register specified by source field src1 in the instruction. The lsb mask has a 0 in all bit positions which are less significant than the bit position specified by constant csta. The lsb mask has a 1 in all bit positions which are equal to and more significant than the bit position specified by constant csta. Most significant bit (msb) mask generation circuitry 620 forms a 32 bit mask based on a number specified by constant field cstb from the instruction or from the register specified by source field src1 in the instruction. The msb mask has a 0 in all bit positions which are more significant than the bit position specified by constant cstb. The msb mask has a 1 in all bit positions which are equal to and less significant than the bit position specified by constant cstb.

Intersection circuitry 630 clears or sets the bit field represented by the union of the lsb mask and the msb mask, as appropriate for the Clear or Set instruction. According to an aspect of the present invention, the operand from source operand circuitry 601 is modified in clear/set circuitry 630 and written to destination circuitry 604 in one phase of the execution pipeline.

Figure 10A:
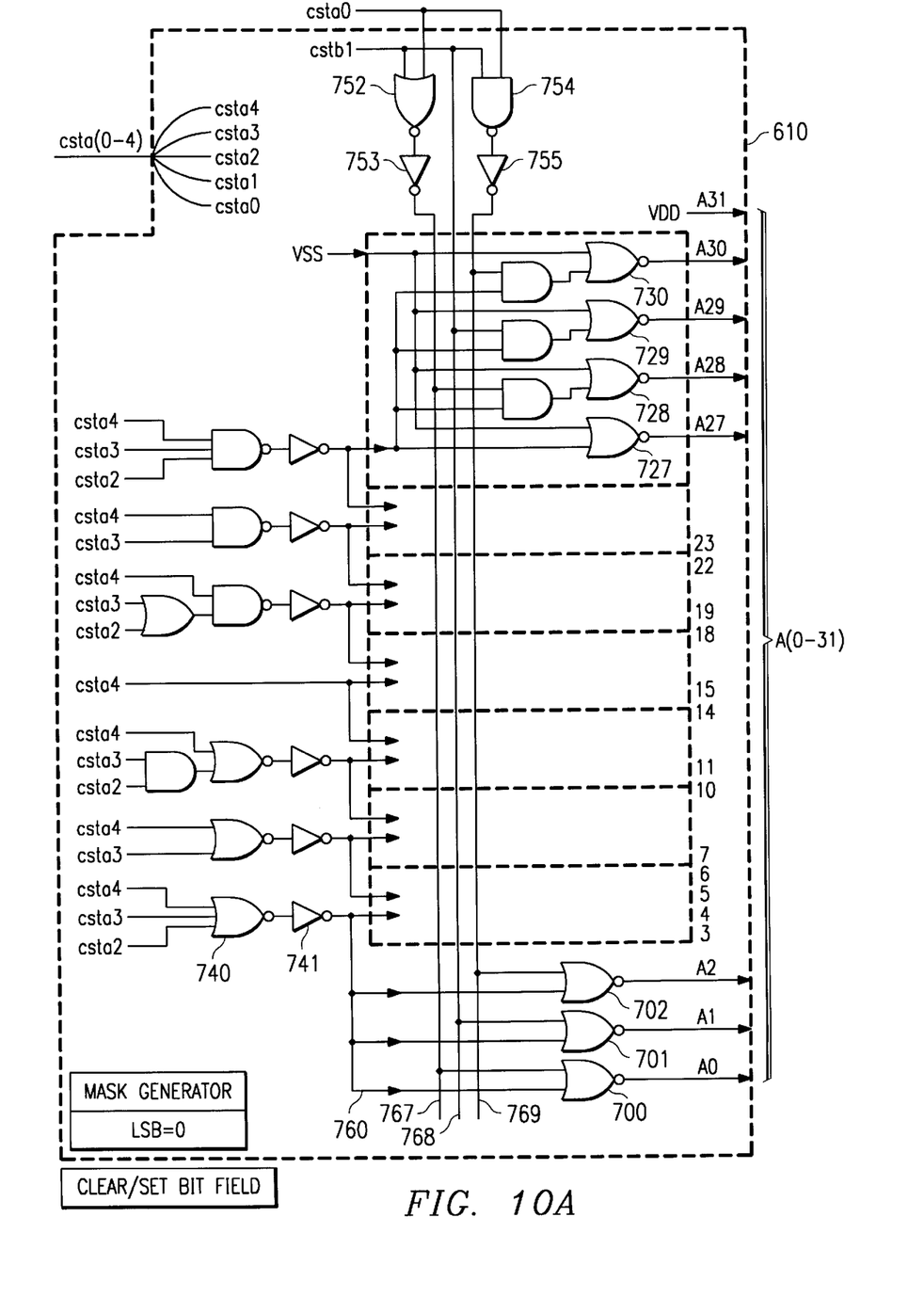
FIG. 10A is a schematic of circuitry of the lsb mask generation block of FIG. 8.

FIG. 10A is a schematic of circuitry of the lsb mask generation circuitry of FIG. 8. The lsb mask has a 0 in all bit positions which are less significant than the bit position specified by constant csta. The lsb mask has a 1 in all bit positions which are equal to and more significant than the bit position specified by constant csta. Constant csta is a 5 bit constant represented by signals csta0–csta4. NOR gate 700 receives signal 760 which is low if csta2–csta4 are all low, as determined by NOR gate 740. NOR gate 700 also receives signal 767 which is low if both csta0 and csta1 are both low, as determined by NOR gate 752. Thus, if constant csta is a 00000b, which specifies bit 0, then the output of NOR gate 700, signal A0 is 1; otherwise signal A0 is 0. NOR gate 701 also receives signal 760 along with signal 768 which is 1 when csta1 is 1. Thus, if constant csta is a 00000b or 00001b, then signal A1 is a 1; otherwise signal A1 is a 0. Likewise, gates 702–730 determine an appropriate value for signals A2–A30 in accordance with the prescribed format of the lsb mask. Signal A31 is always a 1, since even if constant csta is 11111b, signal A31 is to be a 1.

Figure 10B:
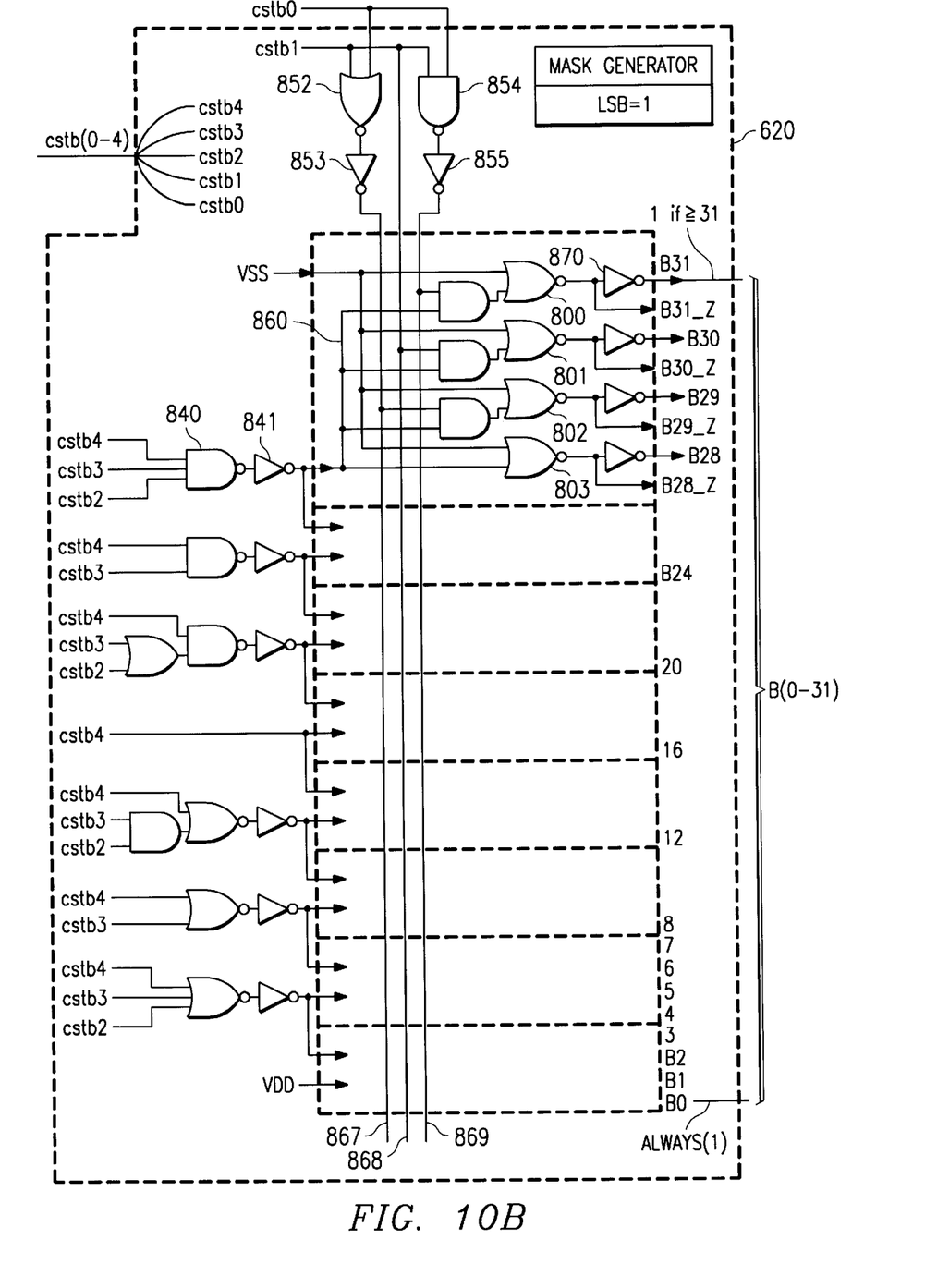
FIG. 10B is a schematic of circuitry of the msb mask generation block of FIG. 8.

FIG. 10B is a schematic of circuitry of the msb mask generation circuitry of FIG. 8. The msb mask has a 0 in all bit positions which are more significant than the bit position specified by constant cstb. The msb mask has a 0 in all bit positions which are equal to and less significant than the bit position specified by constant cstb. Constant cstb is a 5 bit constant represented by signals cstb0–cstb4. The circuitry of FIG. 10B and operates in the same manner as the circuitry of FIG. 10A. For example, AND-OR gate 800 receives signal 860 which is 1 if signals cstb2–cstb4 are 1, as determined by NAND gate 840. Gate 800 also receives signal 855 which is a 1 if signals cstb0–cstb1 are both 1, as determined by NAND gate 854. Thus, the output of gate 800 inverted by gate 870, signal B31, is a 1 if cstb is a 11111b, otherwise signal B31 is a 0.

Figure 10C:
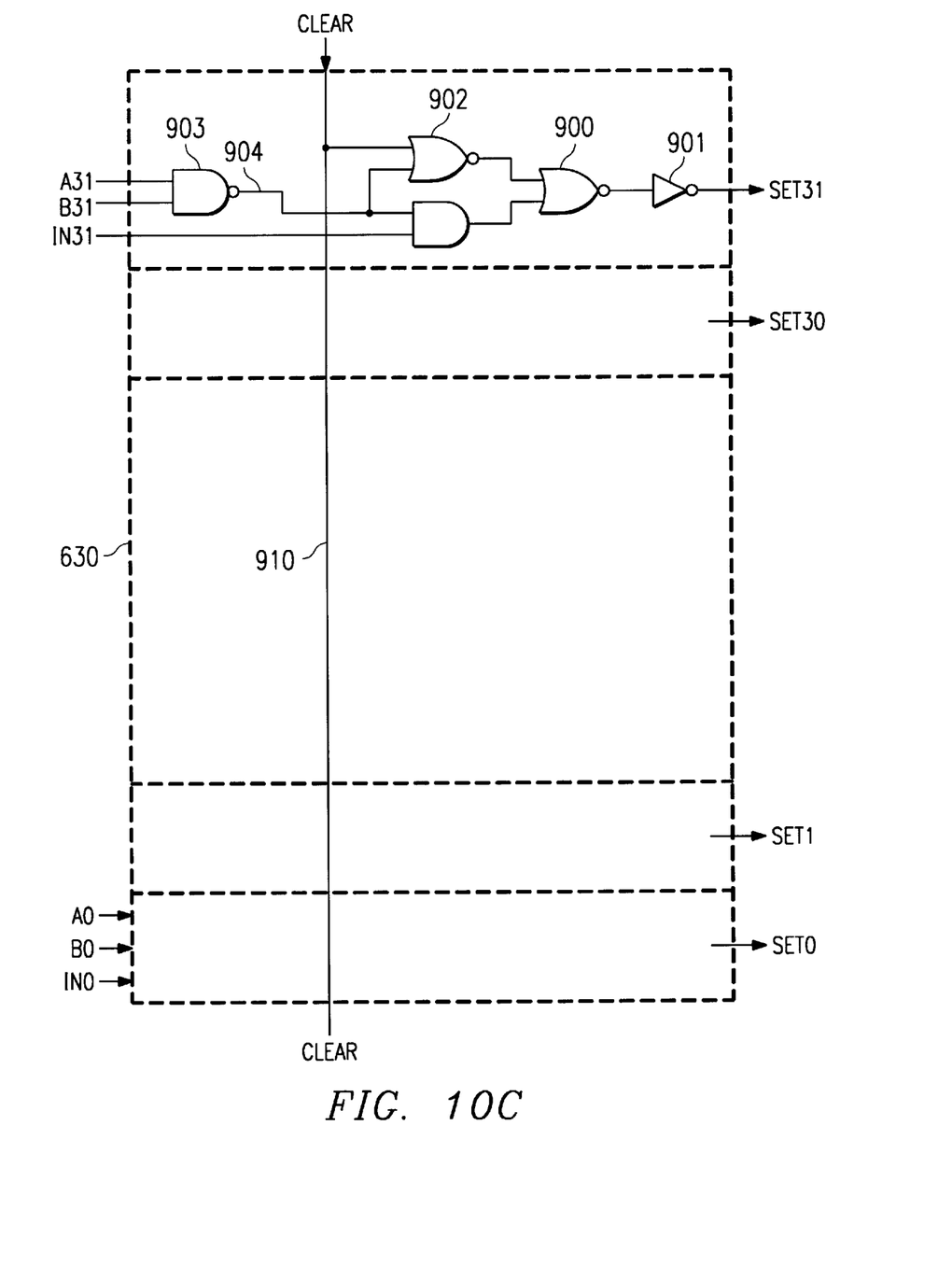
FIG. 10C is a schematic of circuitry of the clear/set block of FIG. 8.

FIG. 10C is a schematic of circuitry of the intersection circuitry of FIG. 8. Each bit of the source operand from source operand circuitry 601 is represented by signals IN0–IN31. If, for a given bit position, there is a union of the corresponding bits of the lsb mask and the msb mask, then the source operand bit is replaced; otherwise the source operand bit is copied into the corresponding bit position in destination operand circuitry 604. Signal 910 is a 1 if a Clear Bit Field instruction is being executed and causes a 0 to be used to replace a bit from the source operand. Signal 910 is a 0 if a Set Bit Field instruction is being executed and causes a 1 to be used to replace a bit from the source operand.

In FIG. 10C bit position 31 is representative; all the other bit position circuitry is the same. AND gate 903 determines when signal A31 and signal B31 are both 1, indicating a union of the masks, by driving signal 904 low. When signal 904 is low, the AND portion of AND-NOR gate 900 blocks signal IN31 and NOR gate 902 passes and inverted copy of signal 910. Thus, signal SET31 is a 1 if signal 910 is 0 and bit 31 of a destination operand is set to 1. Signal SET31 is a 0 of signal 910 is a 1 and bit 31 of a destination is thereby cleared to a 0. When signal A31 and B31 are not both 1, then signal 904 is high, gate 902 is blocked, and the AND portion of gate 900 passes signal IN31 to form a corresponding value on signal SET31. Signals SET0–SET31 deliver an appropriately modified destination operand to destination operand circuitry 604.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device for executing an instruction which sets a field of a source operand to a predetermined value, comprising:

source circuitry operable to hold said source operand;

first circuitry operable to hold a first constant which indicates a first bit position in said source operand;

second circuitry operable to hold a second constant which indicates a second bit position in said source operand;

setting circuitry operable to form a destination operand by setting all bits between said first bit position and said second bit position to said predetermined value and to set other bits to have the same value as corresponding bits of said source operand; and destination circuitry operable to hold said destination operand.

2. The data processing device of claim 1, wherein said setting circuitry further comprises:

first mask generator circuitry operable to form a first mask in response to said first constant;

second mask generator circuitry operable to form a second mask in response to said second constant; and intersection circuitry operable to determine an intersection of said first mask and said second mask and to set all bits of said destination operand corresponding to said intersection to said predetermined value.

3. The data processing device of claim 2, wherein said intersection circuitry is operable to set a plurality of selected bits of said destination operand corresponding to said intersection to either all zeros or all ones in response to a control signal.

4. The data processing device of claim 1, wherein the setting circuitry is operable to form the destination operand in a single instruction execution phase.

5. A data processing device for executing an instruction which sets a field of a source operand to a predetermined value, comprising:

source circuitry operable to hold said source operand;

first circuitry operable to hold a first constant which indicates a first bit position in said source operand;

second circuitry operable to hold a second constant which indicates a second bit position in said source operand;

setting circuitry operable to form a destination operand by setting all bits between said first bit position and said second bit position to said predetermined value, wherein said predetermined value is selected to be either all zeros or all ones in response to a control signal; and destination circuitry operable to hold said destination operand.

6. The data processing device of claim 5, wherein the setting circuitry is operable to form the destination operand in a single instruction execution phase.

7. A method for executing an instruction within a data processing device which sets a field of a source operand to a predetermined value, said method comprising:

providing said source operand;

holding a first constant which indicates a first bit position in said source operand;

holding a second constant which indicates a second bit position in said source operand; and forming a destination operand by setting all bits between said first bit position and said second bit position to said predetermined value such that other bits of said destination operand have the same value as corresponding bits of said source operand.

8. The method of claim 7, wherein said step of forming a destination operand further comprises:

forming a first mask in response to said first constant;

forming a second mask in response to said second constant;

determining an intersection of said first mask and said second mask; and setting all bits of said destination operand corresponding to said intersection to said predetermined value.

9. The method of claim 8, wherein said step of setting is operational to set selected bits of said source operand corresponding to said intersection to either a zero or a one in response to a control signal.

10. A signal processing system, comprising:

sensor means for producing a digital signal in response to a physical input representative of a pattern;

a microprocessor having a central processing unit (CPU) and an internal program memory holding instructions for execution by said CPU;

said microprocessor further comprising:

a central processing unit having an instruction execution pipeline, said pipeline operable to process and execute an instruction which sets a field of a source operand to a predetermined value, said central processing unit further comprising:

source circuitry operable to hold said source operand;

first circuitry operable to hold a first constant which indicates a first bit position in said source operand;

second circuitry operable to hold a second constant which indicates a second bit position in said source operand;

setting circuitry operable to form a destination operand by setting all bits between said first bit position and said second bit position to said predetermined value; and destination circuitry operable to hold said destination operand.

11. The signal processing system of claim 10 wherein said sensor means includes a microphone and an analog-to-digital converter and said program memory holds instructions for a speech recognition process.

12. The data processing device of claim 10, wherein the setting circuitry is operable to form the destination operand in a single instruction execution phase.

* * * * *